(12) United States Patent
Liu

(10) Patent No.: US 7,765,663 B2
(45) Date of Patent: Aug. 3, 2010

(54) METHOD FOR MANUFACTUING A CHAIR SEAT

(76) Inventor: Zhiqing Liu, 7 Chenfeng Road, Fengxiang Industrial Park, Daliang town, Shunde district, Foshan, Guangdong (CN) 528300

( * ) Notice: Subject to any disclaimer, the term of this patent is extended or adjusted under 35 U.S.C. 154(b) by 0 days.

(21) Appl. No.: 12/061,666

(22) Filed: Apr. 3, 2008

(65) Prior Publication Data

US 2008/0246324 A1 Oct. 9, 2008

(30) Foreign Application Priority Data

Apr. 7, 2007 (CN) .................. 2007 1 0027511

(51) Int. Cl.
*B68G 7/00* (2006.01)
(52) U.S. Cl. .................. 29/91.1; 29/91; 297/440.1; 297/440.11; 264/257; 264/404
(58) Field of Classification Search ............ 29/91–91.8; 297/440.1, 448.1, 440.11; 264/257, 404
See application file for complete search history.

(56) References Cited

U.S. PATENT DOCUMENTS

| | | | | |
|---|---|---|---|---|
| 6,292,990 B1 * | 9/2001 | Iseki et al. | ................... | 29/91.1 |
| 6,846,445 B2 * | 1/2005 | Kim et al. | ................... | 264/404 |
| 7,556,317 B2 * | 7/2009 | Bottemiller | ............ | 297/440.11 |

* cited by examiner

*Primary Examiner*—Rick K Chang

(57) ABSTRACT

A method for manufacturing a chair seat, wherein borders of the chair seat is injection molded by two steps, comprises following steps: a. preparing net cloth, inner border injecting mold, outer border injecting mold, plastic and gun screw; b. injecting inner border: warming up inner border injecting mold, simultaneously heating up the plastic, and injecting the plastic into the inner border injecting mold when its temperature reaches the injecting temperature; c. installing the net cloth: cutting out the net cloth according to the size of the inner border, impacting the edge of the net cloth into the inner border by the gun screw by hand, and then cutting redundant net cloth; d. injecting outer border: inserting the inner border with impacted net cloth into the outer border injecting mold, and injecting the plastic into the outer border injecting mold when its temperature reaches the injecting temperature.

2 Claims, 6 Drawing Sheets

METHOD FOR MANUFACTUING A CHAIR SEAT

CROSS-REFERENCE TO RELATED APPLICATION

This application claims the benefit of Chinese Patent Application No. 200710027511.2, filed Apr. 7, 2007, the entire contents of which are incorporated herein by reference.

FIELD OF THE INVENTION

The present invention relates to a chair, and more especially to a chair seat and method for manufacturing the same.

DESCRIPTION OF THE PRIOR ART

Presently people seat in the office having a long time, so the quality of the chair is quite important to health. Now the seat of office chair use sponge and some other material to stuff the chair, it makes the chair soft, but breathes unfreely. When people use in a longtime, it would result in hemorrhoid and some other illness. Further more, ordinary office chair is fit together by adhibiting and nailing to multilayer, the chair is massiness, breath unfreely and expensive.

Chinese patent No. CN200410061163.7 published a method for manufacturing vehicle chair's net mat, comprising: preparing material, drilling plastic strap, wrapping thin steel wire, bending and buckling the main border. The four steps get vehicle chair's net mat of a shape of square. This invention produces the net mat by mold, insuring the net mat standard and high quality, easy to produce artificially, reducing production cost, using the manufacture method in all kind of vehicle chair and sofa, the arts and crafts is convenient. However, this method for manufacturing the chair is still complex, using too much material, the cost is high.

BRIEF SUMMARY OF THE INVENTION

Primary object of the present invention is to provide a chair seat and method for manufacturing the same that for solving breathe unfreely, distortion and some other vices, overcoming the shortage of existing technology.

To achieve the above-mentioned object. a chair seat is provided which comprising: a seat body; two layers of borders arranged around said chair seat from inside to outside; a net cloth set in a middle of said chair seat and edges of said net cloth fixed between said borders; wherein said chair seat is injection molded by one or two steps; and said two layers of borders are detachable or undetachable.

Wherein said chair seat is injection molded by two steps, an inner border and an outer border are arranged around said chair seat from inside to outside, said inner border is a shape of square of which four corners are set as radian and both bottom portions of a front end and a back end extend downwardly to form a mounting portion for mounting and fixing onto a horse of an office chair.

Wherein the size of said outer border is corresponding to that of said inner border of which a section is a shape of arc or saddle, and both the right and left side edges cock upwardly for enhancing the comfort of said chair seat.

Wherein both inner and outer borders are detachable, and a clasp and/or groove engaged each other are set at the corresponding part of said inner border and outer border set matchable bayonet catch fastener.

A method for manufacturing a chair seat, wherein borders of said chair seat is injection molded by two steps, comprising below steps:

a preparing material: net cloth, injecting mold, plastic and gun screw.

b injecting inner border: warming up inner border injecting mold, simultaneously heating up said plastic, and injecting said plastic into said inner border injecting mold when the temperature reaches the injecting temperature;

c installing said net cloth: cutting out said net cloth according to the size of said inner border, reserving 2-3 centimeter around said net cloth, impacting the edge of said net cloth into said inner border by said gun screw artificially, and then cutting redundant net cloth;

d injecting outer border: warming up said outer border injecting mold, simultaneously heating up said plastic, inserting said inner border with impacted net cloth into said outer border injecting mold, and injecting said plastic into said outer border injecting mold when the temperature reaches the injecting temperature.

The structure of the present invention is simple, the manufacture working procedures are few, and the production cost is low. The present product is simple and safe. Because of using the net cloth to produce the chair seat, it is breath freely, having several colors to choose, beautiful and environmental protection, satisfying the demand of all levels customers.

Other objects, advantages and novel features of the present invention will become more apparent from the following detailed description when taken in conjunction with the accompanying drawings, in which:

DETAILED DESCRIPTION OF THE INVENTION

Figure 1:
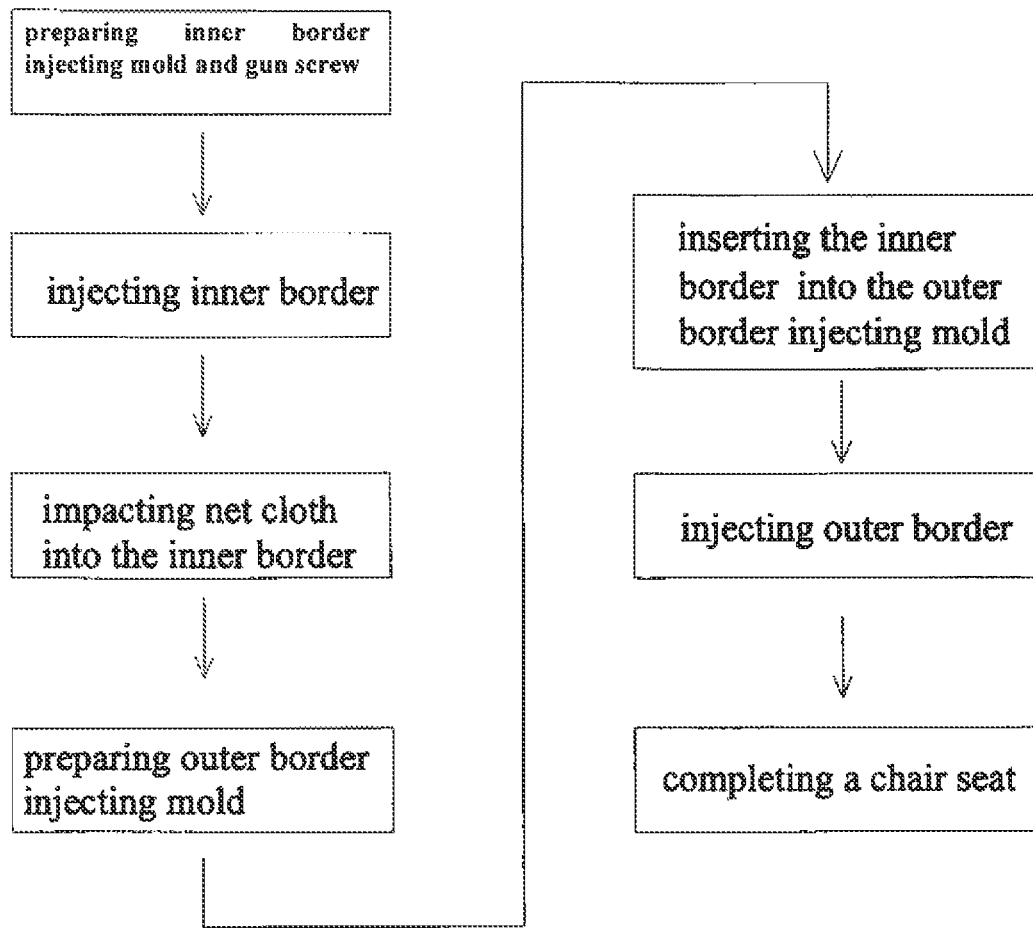
FIG. 1 is a flow drawing of a manufacture method of the present invention.
Figure 2:
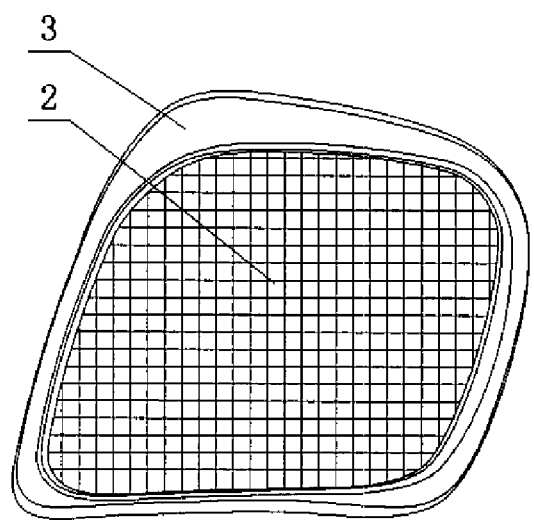
FIG. 2 is a perspective view drawing of a first embodiment in accordance with the present invention.
Figure 3:
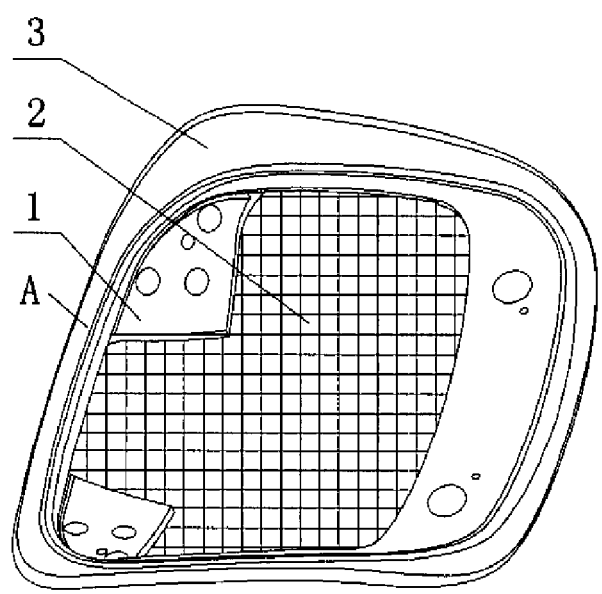
FIG. 3 is a perspective view structural drawing of backsight in FIG. 2.
Figure 4:
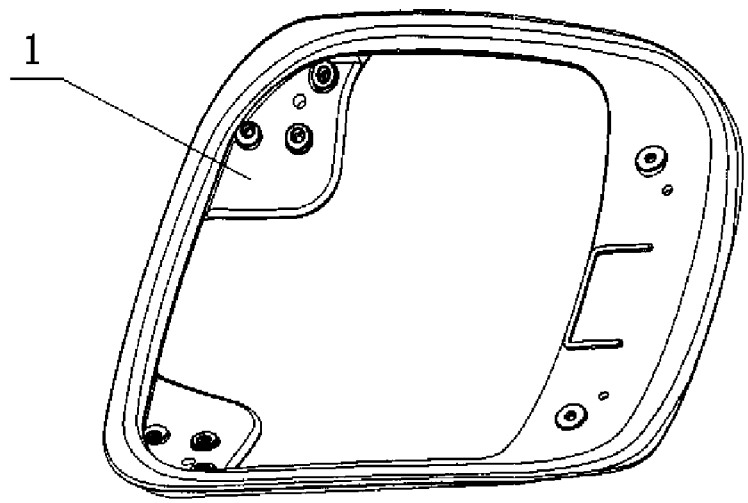
FIG. 4 is a perspective view structural drawing of the inner border in FIG. 2.
Figure 5:
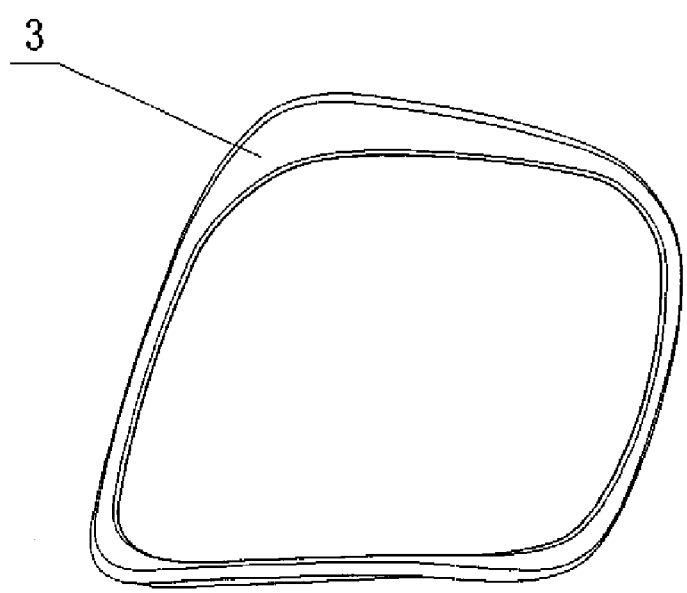
FIG. 5 is a perspective view structural drawing of the outer border in FIG. 2.
Figure 6:
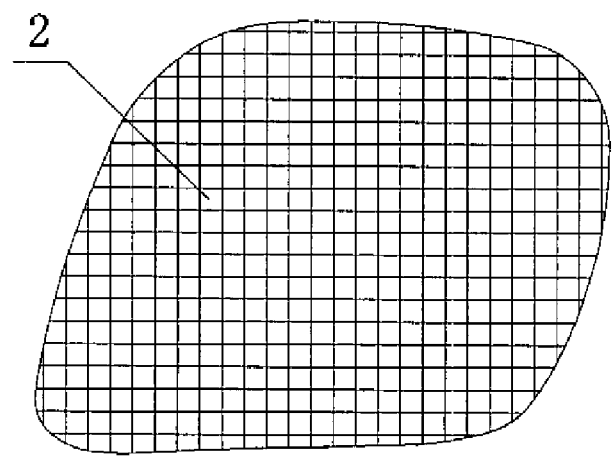
FIG. 6 is a perspective view structural drawing of the net cloth in FIG. 2.
Figure 7:
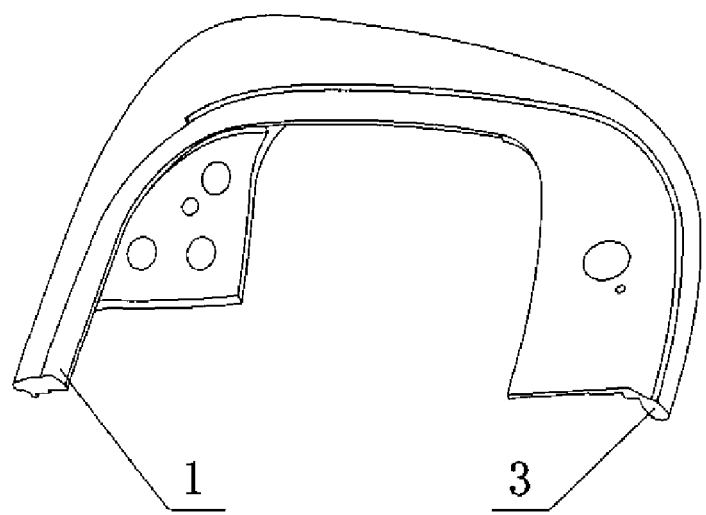
FIG. 7 is a section plane structural drawing of A in FIG. 2.
Figure 8:
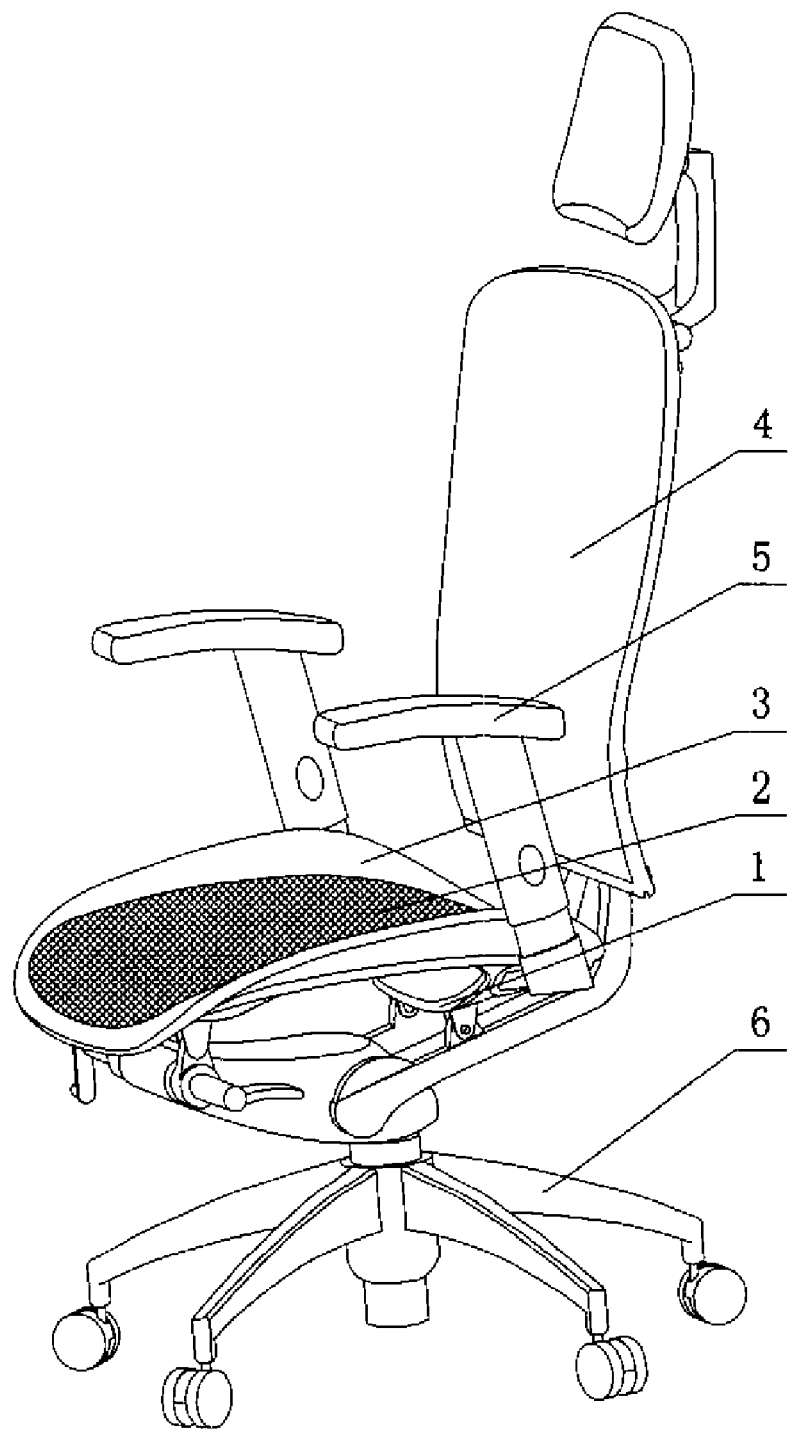
FIG. 8 is a using state drawing of the present invention.
Figure 9:
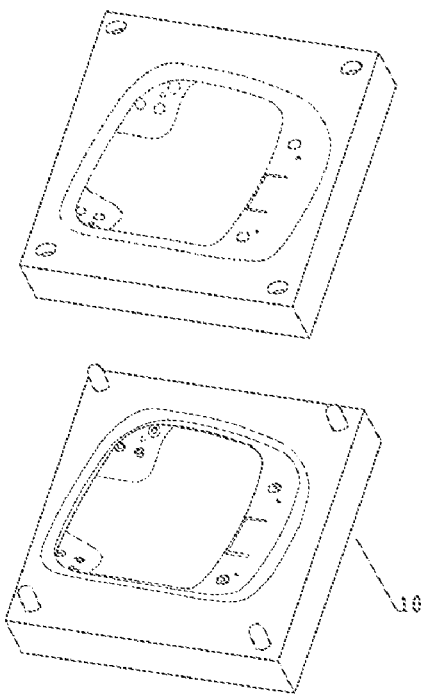
FIG. 9 is a perspective view structural drawing of the inner border injecting mold.
Figure 10:
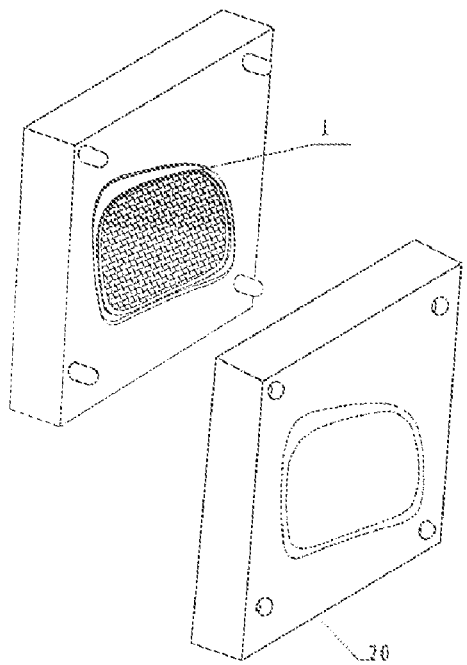
FIG. 10 is a perspective view structural drawing of the outer border injecting mold with the inner border with impacted net inserted in it.

As shown in FIG. 1, FIG. 9 and FIG. 10, a chair seat, wherein borders of the chair seat is injection molded by two steps, comprising below steps:

a. preparing material: net cloth, injecting mold, plastic and gun screw.

b. injecting inner border: warming up inner border injecting mold 10, simultaneously heating up the plastic, and injecting the plastic into the inner border injecting mold 10 when the temperature reaches the injecting temperature;

c. installing the net cloth: cutting out the net cloth according to the size of the inner border, reserving 2-3 centimeter around the net cloth, impacting the edge of the net cloth into the inner border by the gun screw artificially, and then cutting redundant net cloth;

d. injecting outer border: warming up the outer border injecting mold 20, simultaneously heating up the plastic, inserting the inner border 1 with impacted net cloth into the outer border injecting mold 20, and injecting the plastic into the outer border injecting mold 20 when the temperature reaches the injecting temperature.

As shown in FIG. 2 to FIG. 8, an office chair, comprising a chair seat a chair back 4, armrests 5, a horse 6, the inner border 1 and the outer border 3 which are injection molded by two steps arranged around the chair seat from inside to outside. A net cloth 2 set in a middle of the chair seat, a middle portion of the net cloth 2 is a mesh structure and elasticity cloth is set along edges of the mesh structure; the edges of the net cloth 2 are impacted into the inner border 1 by gun screws along the edges of the inner border 1.

the inner border 1 is a shape of square of which four corners are set as radian and both bottom portions of a front end and a back end extend downwardly to form a mounting portion for mounting and fixing onto a horse of an office chair. the size of the outer border 3 is corresponding to that of the inner border 1 of which a section is a shape of arc or saddle, and both the right and left side edges cock upwardly for enhancing the comfort of the chair seat.

In accordance with the present invention, the inner border 1 and the outer border 3 are undetachable. But in another embodiment in accordance with the present invention, the inner border 1 and the outer border 3 are detachable, and a clasp and/or groove engaged each other are set at the corresponding part of the inner border 1 and outer border 3 set matchable bayonet catch fastener. it can be replacing the net cloth 2, or the inner border 1, or the outer border 3.

What is claimed is:

1. A method for manufacturing a chair seat, wherein borders of said chair seat is injection molded by two steps, comprising below steps:
   a. preparing material: net cloth, inner border injecting mold, outer border injecting mold and plastic;
   b. injecting inner border: warming up said inner border injecting mold, simultaneously heating up said plastic, and injecting said plastic into said inner border injecting mold when its temperature reaches the injecting temperature;
   c. installing said net cloth: cutting out said net cloth according to the size of said inner border, reserving 2-3 centimeter around said net cloth, impacting the edge of said net cloth into said inner border, and then cutting redundant net cloth;
   d. injecting outer border: warming up said outer border injecting mold, simultaneously heating up said plastic, inserting said inner border with impacted net cloth into said outer border injecting mold, and injecting said plastic into said outer border injecting mold when its temperature reaches the injecting temperature.

2. A method for manufacturing a chair seat, as set forth in claim 1, wherein said net cloth is nylon net cloth, and said borders are made of nylon plastic, polypropylene, polythene or polycarbonate.

* * * * *